(12) United States Patent
Das

(10) Patent No.: US 8,050,919 B2
(45) Date of Patent: Nov. 1, 2011

(54) SPEAKER RECOGNITION VIA VOICE SAMPLE BASED ON MULTIPLE NEAREST NEIGHBOR CLASSIFIERS

(75) Inventor: Amitava Das, Bangalore (IN)

(73) Assignee: Microsoft Corporation, Redmond, WA (US)

( * ) Notice: Subject to any disclaimer, the term of this patent is extended or adjusted under 35 U.S.C. 154(b) by 951 days.

(21) Appl. No.: 11/771,794

(22) Filed: Jun. 29, 2007

(65) Prior Publication Data

US 2009/0006093 A1    Jan. 1, 2009

(51) Int. Cl.
*G10L 17/00* (2006.01)
(52) U.S. Cl. .................. 704/246; 704/231; 704/230
(58) Field of Classification Search .............. 704/246, 704/231, 230
See application file for complete search history.

(56) References Cited

U.S. PATENT DOCUMENTS

| | | | |
|---|---|---|---|
| 5,412,738 A | 5/1995 | Brunelli et al. | |
| 5,666,466 A | 9/1997 | Lin et al. | |
| 5,794,190 A * | 8/1998 | Linggard et al. | 704/232 |
| 6,094,632 A | 7/2000 | Hattori | |
| 6,182,037 B1 | 1/2001 | Maes | |
| 6,330,536 B1 | 12/2001 | Parthasarathy et al. | |
| 6,477,500 B2 | 11/2002 | Maes | |
| 6,519,561 B1 * | 2/2003 | Farrell et al. | 704/232 |
| 6,529,871 B1 | 3/2003 | Kanevsky et al. | |
| 6,760,701 B2 * | 7/2004 | Sharma et al. | 704/249 |
| 2003/0182118 A1 * | 9/2003 | Obrador et al. | 704/246 |
| 2005/0096906 A1 * | 5/2005 | Barzilay | 704/249 |
| 2005/0187916 A1 * | 8/2005 | Levin et al. | 707/3 |
| 2006/0111904 A1 * | 5/2006 | Wasserblat et al. | 704/246 |

OTHER PUBLICATIONS

"The 2002 SuperSID Workshop on Speaker Recognition", *The Center for Language and Speech Processing*, Oct. 24, 2003. <http:www.clsp.jhu.edu/ws2002/groups/supersid/>.
Aggarwal, et al. "A System Identification Approach for Video-based Face Recognition", *Proceedings of ICPR*, 2004. pp. 23-26.
Brunelli, et al. "Person Identification Using Multiple Cues", *IEEE Transactions on Pattern Analysis and Machine Intelligence (PAMI)*, vol. 17, No. 10, Oct. 1999. pp. 955-966.
Buck, et al. "Text-Dependent Speaker Recognition Using Vector Quantization", Apr. 1985. pp. 391-394.
Buik, et al. "Face Recognition from Multi-Pose Image Sequence", *Proceedings of 2nd International Symposium on Image and Signal Processing*, 2001. pp. 319-324.
Campbell. "Speaker Recognition: A Tutorial", *Proceedings of the IEEE*, vol. 85, No. 9, Sep. 1997 (26 pages).
Chibelushi, et al. "A Review of Speech Based Bimodal Recognition", *IEEE Transactions on Multimedia*, vol. 4, No. 1, Mar. 2002. pp. 23-37.

(Continued)

*Primary Examiner* — Jakieda Jackson
(74) *Attorney, Agent, or Firm* — Perkins Coie LLP

(57) ABSTRACT

A speaker recognition system generates a codebook store with codebooks representing voice samples of speaker, referred to as trainers. The speaker recognition system may use multiple classifiers and generate a codebook store for each classifier. Each classifier uses a different set of features of a voice sample as its features. A classifier inputs a voice sample of an person and tries to authenticate or identify the person. A classifier generates a sequence of feature vectors for the input voice sample and then a code vector for that sequence. The classifier uses its codebook store to recognize the person. The speaker recognition system then combines the scores of the classifiers to generate an overall score. If the score satisfies a recognition criterion, then the speaker recognition system indicates that the voice sample is from that speaker.

20 Claims, 8 Drawing Sheets

OTHER PUBLICATIONS

Das, et al. "Audio-Visual Biometric Recognition by Vector Quantization", *IEEE International Workshop on Spoken Language Technology*, Aruba, Dec. 2006, to Appear.

Das, et al. "Face Recognition from Images with High Pose Variations by Transform Vector Quantization", *Computer Vision, Graphics and Image Processing*. vol. 4338-2006, Lecture Notes in Computer Science, Springer Berlin Heidelberg. Copyright 2006, pp. 674-685.

Das, et al. "Text-dependent speaker recognition: A survey and state of the art", 2006 *IEEE International Conference on Acoustics, Speech, and Signal Processing (ICASSP)*, May 14-19, 2006, Toulouse, France.

Das. "Audio Visual Person Authentication by Multiple Nearest Neighbor Classifiers", *Advances in Biometrics*, Lecture Notes in Computer Science, vol. 4642.2007. Copyright 2007, pp. 1114-1123.

Das. "Speaker Recognition by Text Dependent Vector Quantization with Password Conditioning", Microsoft Research—India. Bangalore, India. 2007.

Gersho, Allen, and Gray, Robert M. *Vector Quantization and Signal Compression*. Springer, 1992. 760 pgs.

Gong, et al. "Tracking and Recognition of Face Sequences", European Workshop on Combined Real and Synthetic Image Processing for Broadcast and Video Production, 1994.

Hafed, et al. "Face Recognition Using the Discrete Cosine Transform", *International Journal of Computer Vision*, vol. 43, Issue 3, Jul./Aug. 2001. pp. 167-188.

Howell, et al. "Towards Unconstrained Face Recognition from Image Sequences", *Proceedings of the International Conference on Automatic Face Recognition*, 1996. 224-229.

Kanak, at al. "Joint Audio Video Processing for Biometric Speaker Identification", *Proceedings MMUA-06*, May 2006.

Kinnunen, et al. "Real-Time Speaker Identification and Verification", *IEEE Transactions on Audio, Speech and Language Processing*, vol. 14, No. 1, Jan. 2006.

Kinnunen, at al. "Speaker Discriminative Weighting Method for VQ-Based Speaker Identification", *Proceedings AVBPA 2001*, pp. 150-156, Halmstad, Sweden, 2001.

Kittler, et al. "Combining Evidence in Multimodal Personal Identity Recognition Systems", *Proceedings of the International Conference on Audio- and Video-Based Biometric Person Authentication*, Crans Montana, Switzerland, 1997.

Krueger, et al. "Exemplar-based Face Recognition from Video", *Proceedings of ECCV*, 2002. pp. 732-746.

Lee, et al. "Video-based face recognition using probabilistic appearance manifolds", *Proceedings of IEEE Computer Society Conference on Computer Vision and Pattern Recognition (CVPR '03)*, vol. 1, pp. 313-320.

Li, et al. "Automatic Verbal Information Verification for User Authentication", *IEEE Transactions on Speech and Audio Processing*, vol. 8, No. 5, Sep. 2000.

Li, et al. "Video-Based Online Face Recognition Using Identity Surfaces", Technical Report, Queen Mary, University of London. 2001.

Marcel, et al. "Bi-Modal Face & Speech Authentication: A BioLogin Demonstration System", Proceedings MMUA-06, May 2006.

Matsui, et al. "A Text-Independent Speaker Recognition Method Robust Against Utterance Variations", *Proceedings of the International Conference on Acoustics, Speech, and Signal Processing, (ICASSP)1991*. ICASSP-91., 1991 pp. 377-380. ISBN:0-7803-0003-3.

Moghaddam, et al. "Face Recognition using View-Based and Modular Eigensspaces", *Automatic Systems for the Identification and Inspection of Humans*, SPIE vol. 2277, Jul. 1994.

Phillips, et al. "Face Recognition Vendor Test 2002: Evaluation Report", Technical Report NISTIR 6965, Mar. 2003. <http://www.frvt.org>.

Ramasubramanian, et al. "Text-Dependent Speaker-Recognition Using One-Pass Dynamic Programming", *Proceedings ICASSP '06*, Toulouse, France, May 2006.

Rao, K.R., Yip, Patrick, Britanak, Vladimir. *Discrete Cosine Transform—Algorithms, Advantages, Applications*. Academic Press Professional, Inc., 1990. San Diego, CA, USA.

Rosenberg, et al. "Evaluation of a Vector Quantization Talker Recognition System in Text Independent and Text Dependent Modes", *ICASSP 86*, Tokyo. 1986 IEEE pp. 873-876.

Soong. "A Vector Quantization Approach to Speaker Recognition", *Acoustics, Speech, and Signal Processing, IEEE International Conference on ICASSP '85*. </xpl/RecentCon.jsp?punumber=8361>. Publication Date: Apr. 1985. vol. 10, pp. 387-390 Posted online: Jan. 29, 2003 10:25:51.0.

Sviridenko. "Speaker Verification and Identifcation Systems from SPIRIT Corp.", 2000 (8 pages).

Turk, et al. "Eigenfaces for Recognition", *Journal of Cognitive Neuroscience*, 3(1). 1991 pp. 71-86.

Yang, et al. "Detecting Faces in Images: A Survey", *IEEE Transactions on Pattern Analysis and Machine Intelligence (PAMI)*, vol. 24, No. 1, Jan. 2002. 34-58.

Zhao, et al. "Face Recognition: A Literature Survey," *ACM Computing Surveys*, pp. 399-458, 2003. (Also appeared as UMD Technical Report, CS-TR4167, <ftp://ftp.cfar.umd.edu/TRS/FaceSurvey.ps.qz> 2000. Revised 2002, CS-TR4167R:.

Zhou, et al. "Probabilistic recognition of human faces from video", *Computer Vision and Image Understanding*, vol. 91. (2003) 214-215.

\* cited by examiner

# US 8,050,919 B2

SPEAKER RECOGNITION VIA VOICE SAMPLE BASED ON MULTIPLE NEAREST NEIGHBOR CLASSIFIERS

CROSS-REFERENCE TO RELATED APPLICATION(S)

The present application is related to U.S. patent application Ser. No. 11/771,879 entitled "OBJECT IDENTIFICATION AND VERIFICATION USING TRANSFORM VECTOR QUANTIZATION," which is being filed concurrently and which is hereby incorporated by reference in its entirety.

BACKGROUND

Many applications rely on speaker recognition systems to either authenticate a speaker who is purporting to be a specific individual or to identify a speaker from a voice sample. For example, a security application controlling access to a building may authenticate a person requesting to enter the building by collecting a voice sample of the person and a purported identification of the person. Assuming that the true person is authorized to enter the building, the security application compares the input voice sample to previously collected voice samples of the true person to ensure that the person who wants to enter the building is indeed the true person. If so, the security application has authenticated the person and allows the person to enter the building. If not, the security application determines that the person is an imposter and denies entry. As another example, a wiretap application may collect voice samples of a telephone conversation and attempt to use speaker recognition to identify who is speaking. The wiretap application compares the voice sample to previous voice samples of known persons. If a match is found, the wiretap application has identified the speaker as the matching person.

Many speaker recognition techniques have been proposed to authenticate or identify a speaker by comparing a voice sample to a collection of voice samples. These speaker recognition systems can be classified as text-independent or text-dependent. In a text-independent speaker recognition system, a person can say any sequence of words both when training the speaker recognition system and when providing a voice sample for speaker recognition. A text-independent speaker recognition system employs a static analysis in which features (e.g., division of the sample into utterances) extracted from the speech are analyzed independently regardless of sequence. For example, the speaker can say "one two three" or "one three two" and the system will recognize the speaker. Text-independent speaker recognition systems typically use either a Gaussian Mixture Model or Vector Quantization. (See Reynolds, D., et al., "Speaker Verification Using Adapted Gaussian Mixture Models," Digital Signal Processing, 10(1-3), 2000; Soong, F. K., Rosenberg, A. E., Juang, B. H., and Rabiner, L. R., "A Vector Quantization Approach to Speaker Recognition," AT&T Journal, Vol. 66, pp. 14-26, 1987.)

In a text-dependent speaker recognition system, the system tells the speaker what to say or the speaker knows what to say (e.g., a password). A text-dependent speaker recognition system employs a dynamic analysis in which a sequence of features is analyzed to determine whether it corresponds to the known phrase as previously spoken by the speaker. Text-dependent speaker recognition systems typically use dynamic programming or a hidden Markov model.

Text-dependent speaker recognition systems typically require more training samples and are more computationally complex than text-independent speaker recognition systems. As result, text-dependent speaker recognition systems tend to be more accurate, but they support only a very limited vocabulary and sequence of words.

Typical speaker recognition systems have an initial training phase in which voice samples of a speaker are collected, features are extracted, and a model is generated from the extracted features for use in recognition. After a model is generated, a speaker recognition system inputs a target voice sample, extracts features, and compares them to the model or models. A popular set of features is referred to as the Mel Frequency Cepstral Coefficients ("MFCCs"). Typically, 12 or 13 features of the MFCC are extracted to form a feature vector. A voice sample is typically divided into overlapping frames of 10-20 milliseconds each and a feature vector is extracted from each frame. Thus, a one-second voice sample with a 20 ms frame size will have 50 frames with 50 feature vectors represented as $X(1), X(2), \ldots X(50)$. With static analysis, each feature vector is processed independently of the other feature vectors. With dynamic analysis, each feature vector is processed based on its sequential relationship to the other feature vectors. With dynamic analysis, a speaker recognition system analyzes how well entire sequences match, which is computationally expensive. To reduce the computational expense, some speaker recognition systems perform a static analysis on the MFCC features of a frame and, to capture the dynamics of the voice sample, a static analysis of the differences between the MFCC features of adjacent frames.

Typical speaker recognition systems are either template-based or vector quantization-based. A template-based speaker recognition system extracts features during training and keeps a single template for each feature as a representative of the speaker. Thus, there is one template for each speaker of the training data. During the speaker recognition, a feature vector is extracted from the voice sample and compared to all the templates. The speaker recognition system identifies the speaker as the person associated with the template that is closest to (e.g., a Euclidean distance) the extracted feature vector.

A vector quantization-based speaker recognition system creates a codebook for each speaker during training using standard vector quantization techniques. To generate a codebook, the speaker recognition system collects many voice samples and extracts a sequence of feature vectors for each sample. The speaker recognition system then compresses the dimensionality of the sequences of feature vectors to form code vectors. The speaker recognition system then generates a smaller number of code vectors that are representative of groups of the sequences of feature vectors that are similar. A codebook thus contains fewer code vectors than the voice samples and the code vectors have a lower dimensionality than the feature vectors. There is one codebook for each speaker. During speaker recognition, a sequence of feature vectors is extracted from the voice sample and its dimensionality is reduced to generate a code vector. The speaker recognition system then identifies the speaker as a person associated with the codebook that is closest to the code vector.

SUMMARY

Speaker authentication of a person based on an input voice sample from that person is provided. A speaker recognition system generates a codebook store with codebooks representing voice samples of speakers during a training phase. The speaker recognition system may use multiple classifiers and generate a codebook store for each classifier. Each classifier uses a different set of features of a voice sample as its features.

During recognition phase, a classifier inputs a voice sample of a person and tries to authenticate or identify the person. A classifier generates a sequence of feature vectors for the input voice sample and then a code vector for that sequence. The classifier uses its codebook store to recognize the unknown person. The speaker recognition system then combines the scores of the classifiers to generate an overall score. If the score satisfies a recognition criterion, then the speaker recognition system indicates that the voice sample is from a speaker. Otherwise, the speaker recognition system indicates that the voice sample is cannot be recognized.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
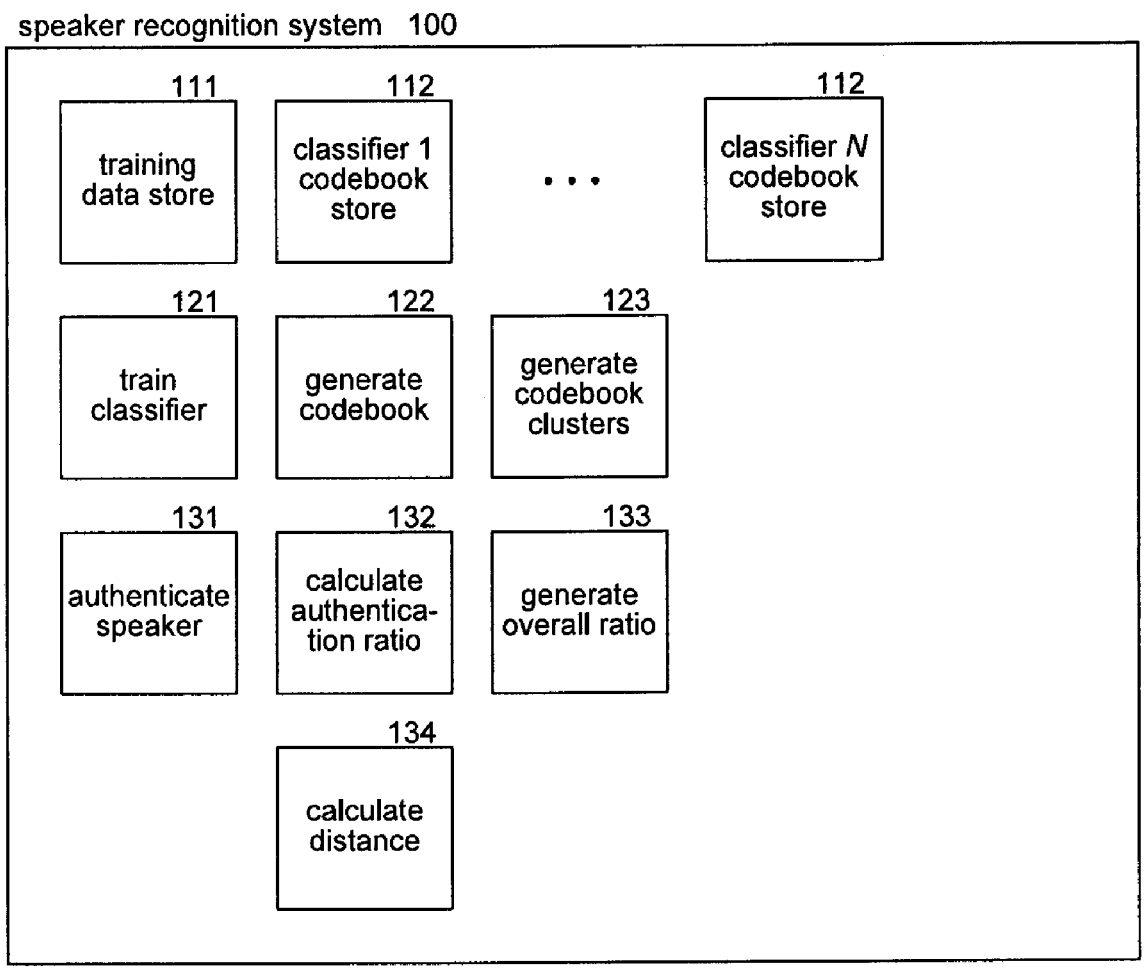
FIG. 1 is a block diagram that illustrates components of the speaker recognition system in one embodiment.

Speaker authentication of a person based on an input voice sample from that person is provided. In some embodiments, the speaker recognition system may be a text-conditioned technique, rather than strictly text-dependent or text-independent. A text-conditioned speaker recognition system requests users to select a set of words in their own language as their "password." The text-conditioned speaker recognition system, unlike a text-dependent technique, does not construct a model based on the text sentence of the voice sample. Since the passwords are in the speaker's own language and the words are selected by the speaker, the voice samples of the passwords tend to be phonetically, acoustically, and linguistically well separated. In addition, the dynamics of the voice sample can discriminate better than text-dependent techniques. Since the speakers select their passwords, the content can be used to help distinguish speakers (unless two speakers happen to select the same password in the same language).

The speaker recognition system includes a training phase and a recognition phase. During the training phase, the speaker recognition system collects voice samples from speakers whose identity is known and generates a representation of the voice samples for use in speaker recognition. During the recognition phase, the speaker identification system recognizes a person as one of the speakers of the training phase by either authenticating the identity of the person or identifying the person using a sample of that person's voice. When authenticating a person, the speaker recognition system inputs the purported identity of a speaker along with the voice sample and determines whether the voice sample is from that speaker based on the voice samples collected during the training phase. When identifying a person, the speaker recognition system determines the identity of the person based on comparison of the voice sample to the voice samples of the speakers collected during training.

In some embodiments, a speaker recognition system generates a codebook store with codebooks representing voice samples of speakers during the training phase. The speaker recognition system generates a codebook for a speaker by collecting voice samples of that speaker, creating a sequence of feature vectors of each voice sample, vector quantizing each sequence into a code vector, clustering the code vectors, and selecting a representative code vector of each cluster to be a code vector of the codebook for that speaker. The speaker recognition system may use multiple classifiers for classifying a voice sample based on different combinations of features of the voice sample. The speaker recognition system may thus generate for each speaker a codebook store for each classifier.

During the recognition phase, a classifier inputs a voice sample of a person and tries to authenticate the person. A classifier generates a sequence of feature vectors for the input voice sample and then a code vector for that sequence. The classifier uses its codebook store to recognize the person. Since each classifier uses a different set of features of a voice sample as its features, each classifier may or may not recognize the person or may misrecognize the person. When authenticating that a voice sample is from the speaker from whom it purports to be, each classifier of the speaker recognition system generates a score indicating whether the voice sample is from that speaker. The speaker recognition system then combines the scores of the classifiers to generate an overall score. If the score satisfies an authentication criterion, then the speaker recognition system indicates that the voice sample is from that speaker. Otherwise, the speaker recognition system indicates that the voice sample is from an imposter.

In some embodiments, when performing authentication, the speaker recognition system generates a score for a classifier. The score may be a ratio (also referred to as an "authentication ratio") of a true distance to an imposter distance. The true distance is the distance from the input voice sample of the person to the voice sample of the purported speaker. The imposter distance is the minimum distance from the input voice sample of the person to the voice samples of persons other than the purported speaker. If the input voice sample is closer to the voice sample of the purported speaker than any other speaker represented in the codebook store, then the ratio will be less than one. Otherwise, the ratio will be greater than one. The speaker recognition system calculates a distance between voice samples as the square of the distance between the code vectors of the voice samples. The speaker recognition system calculates the distance between a voice sample and a collection of voice samples as the minimum distance between a code vector of the voice sample and the code vectors of the collection of voice samples. In some embodiments, when performing authentication, the speaker recognition system may input multiple voice samples. In such a case, the speaker recognition system calculates a true distance and an imposter distance for each voice sample. The speaker recognition system then combines the true distances into an overall true distance and the imposter distances into an overall imposter distance and bases the recognition on the overall distances.

In some embodiments, the speaker recognition system combines the scores of the classifiers into an overall score using various techniques. One technique is to generate the product of the scores. Since a classifier score, such as an authentication ratio, of less than one may indicate that the voice sample is from the purported speaker, the multiplication of these scores will tend to make the overall score smaller. In contrast, since a classifier score, such as an authentication ratio, of greater than one may indicate the voice sample is from an imposter, the multiplication of these scores will tend to make the overall score larger. For example, if the classifier scores are 0.5, 0.4, 0.1, and 1.1, then the overall score is 0.022 indicating that the input voice sample is likely from the purported speaker even though the classifier score of 1.1 tends to indicate that the voice sample is not likely from the purported speaker. The use of a ratio to represent a score indicating whether the person is an imposter and the multiplication of such ratios tends to increase the separation between scores of imposters and scores of the purported speaker. The speaker recognition system may use an authentication criterion that is a threshold value of one. If the overall score is less than one, then the speaker recognition system indicates that the person is the purported speaker. Otherwise, it indicates that the person is an imposter.

In some embodiments, the speaker recognition system uses a trend-modified product ("TMP") algorithm to generate an overall score. The trend-modified product algorithm determines whether the majority of the scores, such as authentication ratios, of the classifiers are less than or greater than a threshold (e.g., one). If so, the speaker recognition system generates the overall score as the product of the scores that are in the majority. The TMP score thus factors in only the scores of classifiers in the majority.

In some embodiments, the speaker recognition system uses a ratio of trend-modified products ("RTMP") algorithm to generate an overall score. The RTMP algorithm calculates a majority overall score for the classifiers in the majority and a minority overall score for the classifiers in the minority as in the TMP algorithm. The RTMP algorithm then divides the majority overall score by the minority overall score to give the overall score. If the majority overall score is a small number indicating that the person is the purported speaker, then dividing it by a larger minority overall score will make it even smaller. Conversely, if the majority overall score is a large number indicating that the person is an imposter, then dividing it by a smaller minority overall score will make it even larger.

The speaker recognition system may use various criteria to indicate whether a classifier score is low enough to be considered a reliable indication that the person is the purported speaker, whether the majority is considered to be 50% or a higher super-majority, and whether the overall score is low enough to be considered reliable indication that the person is the purported speaker. The speaker recognition system can learn these criteria using a validation set of the training data. After the classifiers are trained using the training data minus the validation set, the speaker recognition system can then perform an authentication for each voice sample in the validation set. For example, the speaker recognition system can repeat the process using different criteria represented as different thresholds until the thresholds converge on a solution. The speaker recognition system may also weight the scores of the various classifiers when combining them into an overall score. The speech recognition system can learn the weights of the classifiers using the validation set and linear regression techniques.

In some embodiments, the speaker recognition system uses segmented feature vectors that are sub-sequences of the sequence of feature vectors generated from a voice sample. The use of segmented feature vectors represents a compromise between static analysis and dynamic analysis. A sequence of feature vectors may be represented as $F_1, F_2, \ldots, F_M$ where M is the number of frames of the voice sample. The segmented feature vectors may be represented as $G_1, G_2, \ldots, G_M$ where $G_1 = <F_1, F_2, \ldots, F_{f1}>$, $G_2 = <F_{f1+1}, F_{f1+2}, \ldots, F_{f2}>$, and so on. The distinguishing characteristics of a person's voice are typically found in just a few frames. For example, different people may pronounce "zero" as "sero," "shero," or "gero." In such a case, the initial frames of the word contain the distinguishing characteristics. The speaker recognition system may use variable lengths for the segments or a fixed length. When using variable lengths, the speaker recognition system may segment the original feature vectors between adjacent feature vectors that are most dissimilar based on a similarity metric such as L2-norm. Thus, a segmented feature vector will tend to keep a sequence of similar segments in the same segment. For example, the feature vectors for the sounds "s," "sh," and "g" in the example above will tend to be in the same distinguishing segment.

In some embodiments, the speaker recognition system generates a feature matrix for the feature vectors of a voice sample. The feature matrix represents all the feature vectors for each frame of a voice sample. The speaker recognition system may compress a feature matrix to represent the dynamics of the voice sample in a compact form. A feature matrix has a row for each feature and a column for each feature vector of a frame in the sequence. Thus, the matrix is an M by N matrix where M is the number of features and N is the number of feature vectors. The speaker recognition system can generate the features (e.g., pitch, energy, and zero-crossing rate) of a frame and add them to the appropriate rows of the feature matrix. Since the same person will say the same thing at different rates at different times, the number of frames in the voice samples will vary. Thus, the number of columns in the feature matrix will also vary. The speaker recognition system may use various techniques to determine whether a feature matrix for one voice sample is similar to a feature matrix for another voice sample even though they have different numbers of columns. Such techniques include discrete time warping techniques and dynamic programming techniques. (See Sakoe, H. and Chiba, S., "A Dynamic Programming Algorithm Optimization for Spoken Word Recognition," IEEE Transactions ASSP, 26(1), pp. 43-49, 1978.) These techniques, while useful in some embodiments, are computationally expensive in both the amount of memory and the number of computations.

In some embodiments to reduce computational complexity or for other appropriate reasons, the speaker recognition system may apply a dimension reduction technique to normalize the number of columns of a feature matrix to a fixed number. The speaker recognition system may use principal component analysis, wavelet decomposition, discrete cosine transforms, an eigenvalue decomposition and so on. The transformation to the normalized feature matrix can be represented by the following:

$$Y = W * FM \quad (1)$$

where Y represents the normalized feature matrix, W represents a two-dimensional transform, and FM represents the feature matrix. The normalized feature matrix is a compact representation of a feature matrix with the same number of features but a fewer number of feature vectors. The speaker recognition system may apply a discrete cosine transform to the feature matrix and select a sub-matrix (e.g., a square sub-matrix) from the top-left corner of the transformed matrix without the first element of the sub-matrix (i.e., the DE component) as the normalized feature matrix.

In one embodiment, the speaker recognition system generates during the training phase a codebook for a speaker for speaker recognition from a sequence of frames of voice samples of that speaker. The frames of a voice sample may be represented as $<X_1, X_2, \ldots, X_M>$ where M is the number of frames. The speaker recognition system creates a feature vector $F_i$ for each frame i. A feature vector contains each feature (e.g., an MFCC feature, a log-area-ratio feature, and a line spectral pairs feature) extracted from the frame. The speaker recognition system generates a code vector for each voice sample from the sequence of feature vectors using techniques such as principal component analysis or vector quantization. One well-known vector quantization technique is the LBG algorithm developed by Linde, Buzo, and Gray. To generate the code vectors of the codebook, the speaker recognition system clusters the code vectors into a number of clusters that is equal to the number of code vectors of a codebook. One well-known clustering technique is K-Means clustering. The speaker recognition system then generates a representative code vector (e.g., a centroid code vector) for each cluster and adds the representative code vector to the codebook. The speaker recognition system represents the codebook of a speaker as follows:

$$CB_i = [C_{i1}, C_{i2}, \ldots, C_{iN}] \qquad (2)$$

where i represents person i, N represents the number of code vectors of the codebook, and each $C_{ij}$ is a K-dimensional code vector, where K is less than the dimensions of F.

The speaker recognition system may represent the similarity between a code vector of a feature vector and a code vector of a codebook as follows:

$$D_{ij} = \|F - C_{ij}\|^2 \qquad (3)$$

where $D_{ij}$ represents the distance between a code vector for an input feature vector, F represents the code vector of the feature vector, and $C_{ij}$ represents the code vector j of the codebook for person i. The distance $D_i$ between the input feature vector and the codebook for person i is the minimum of the distances $D_{ij}$. In some embodiments, the speaker recognition system may use a Gaussian Mixture Model to generate a model for each speaker from the samples for that speaker.

FIG. 1 is a block diagram that illustrates components of the speaker recognition system 100 in one embodiment. The speaker recognition system includes a training data store 111 and, for each classifier, a codebook store 112. The training data store includes an entry for each speaker whose voice samples were used during the training phase. Each entry contains various voice samples of the speaker. Each codebook store for a classifier contains a codebook of code vectors for each speaker.

To generate the codebook stores, the speaker recognition system also includes a train classifier component 121, a generate codebook component 122, and a generate codebook clusters component 123. The speaker recognition system may invoke the train classifier component for each classifier. The train classifier component is passed an indication of a classifier generates the feature vectors that are appropriate to the classifier, and invokes the generate codebook component for each speaker to generate a codebook for that speaker for that classifier. The generate codebook component invokes the generate codebook clusters component to generate the clusters of code vectors for a speaker. The train classifier component then stores the codebooks in the codebook store for the appropriate classifier.

The speaker recognition system also includes an authenticate speaker component 131, a calculate classifier score component 132, a generate overall score component 133, and a calculate distance component 134. The authenticate speaker component is provided with a voice sample along with the identity of a purported speaker. The component invokes the calculate classifier score component for each classifier to calculate a classifier score for the classifier. The component then invokes the generate overall score component to combine the classifier scores of the classifiers. The calculate classifier score component invokes the calculate distance component to calculate the distance between a code vector and a codebook.

The computing devices on which the speaker recognition system may be implemented may include a central processing unit, memory, input devices (e.g., keyboard and pointing devices), output devices (e.g., display devices), and storage devices (e.g., disk drives). The memory and storage devices are computer-readable storage media that may contain instructions that implement the system. In addition, the data structures and message structures may be stored or transmitted via a data transmission medium, such as a signal on a communications link. Various communications links may be used, such as the Internet, a local area network, a wide area network, or a point-to-point dial-up connection, to connect the identification system to other devices (e.g., web servers and user computing devices).

The speaker recognition system may be used in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The speaker recognition system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the training of the classifier can be performed on a computing system different from the computing system that performs the authentication.

Figure 2:
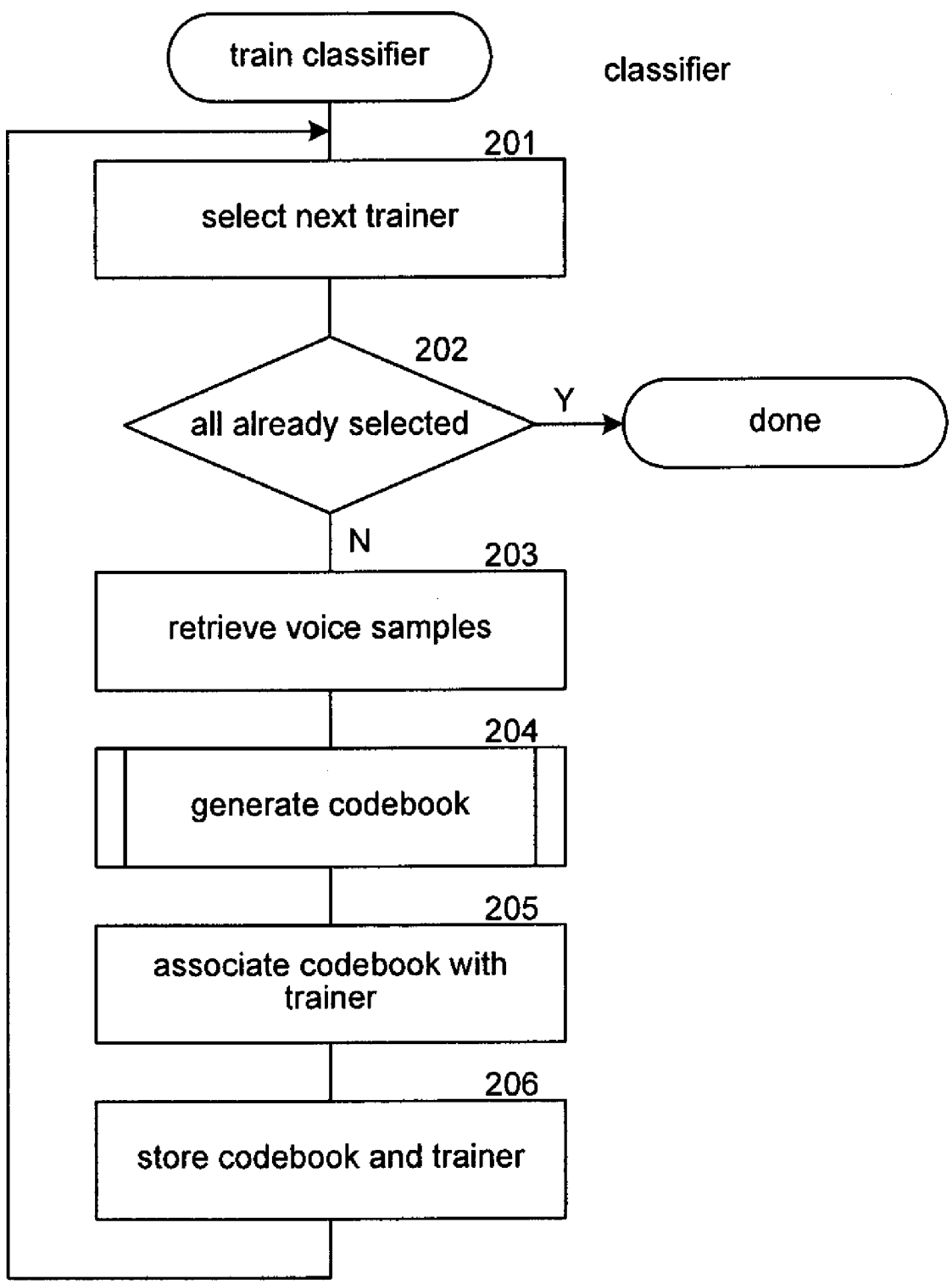
FIG. 2 is a flow diagram that illustrates the processing of the train classifier component of the speech recognition system in one embodiment.

FIG. 2 is a flow diagram that illustrates the processing of the train classifier component of the speaker recognition system in one embodiment. The component is passed an indication of a classifier and generates the codebook store for that classifier. In block 201, the component selects the next speaker from the training data store. In decision block 202, if all the speakers have already been selected, then the component completes, else the component continues at block 203. In block 203, the component retrieves voice samples of the selected speaker from the training data store. In block 204, the component invokes the generate codebook component to generate the codebook for the selected speaker based on features for the selected classifier extracted from the voice samples of that speaker. In block 205, the component associates the codebook with the selected speaker. In block 206, the component stores the association of the codebook and the selected speaker in the codebook store for the selected classifier. The component then loops to block 201 to select the next classifier.

Figure 3:
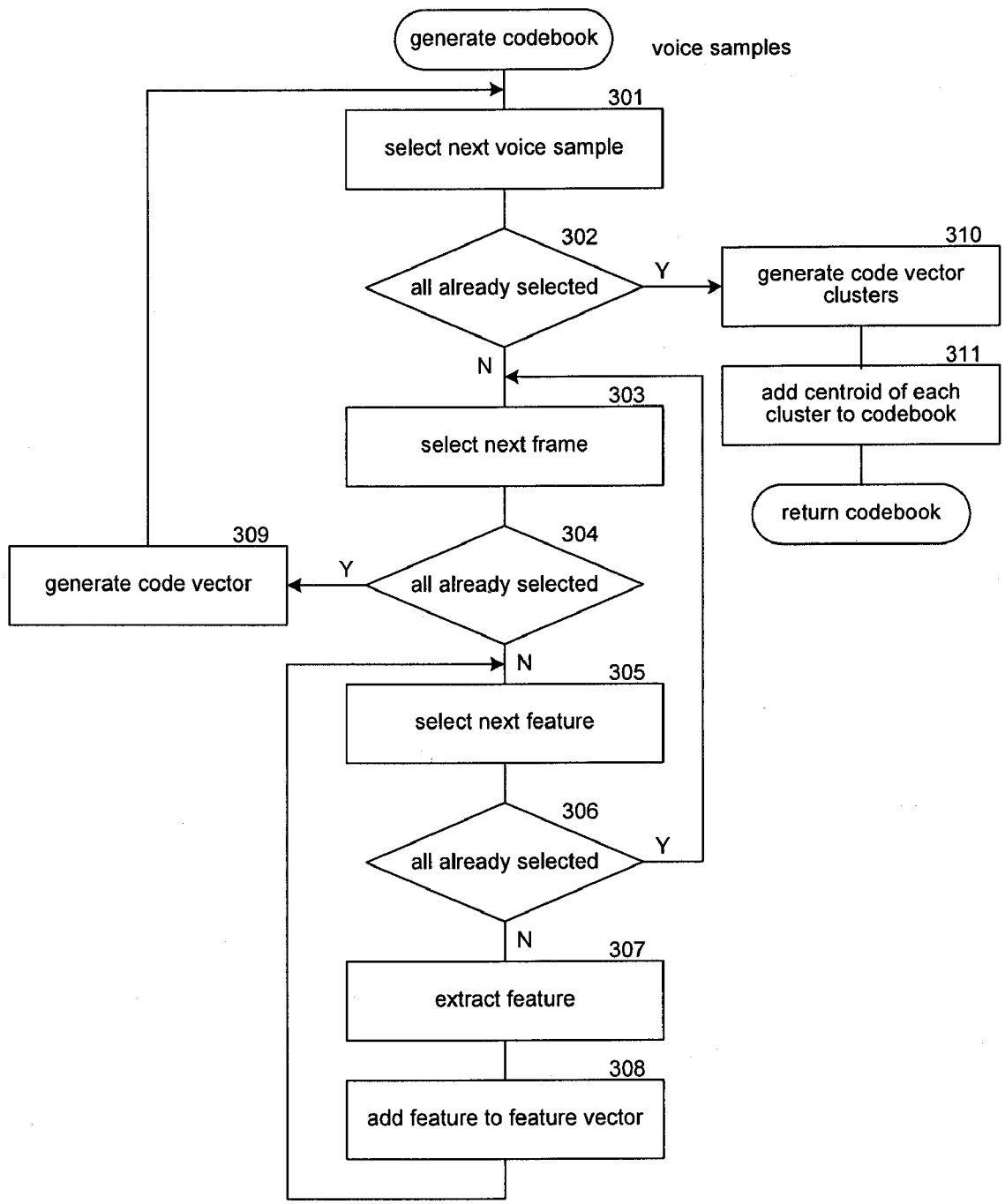
FIG. 3 is a flow diagram that illustrates the processing of the generate codebook component of the speaker recognition system in one embodiment.

FIG. 3 is a flow diagram that illustrates the processing of the generate codebook component of the speaker recognition system in one embodiment. The component is passed voice samples of a speaker and generates the corresponding codebook for a classifier. In blocks 301-309, the component loops generating a code vector for each sample. In block 301, the component selects the next sample. In decision block 302, if all the voice samples have already been selected, then the component continues at block 310, else the component continues at block 303. In block 303, the component selects the next frame of the selected voice sample. In decision block 304, if all the frames have already been selected, then the component continues at block 309, else the component continues at block 305. In block 305, the component selects the next feature of the classifier for the selected frame. In decision block 306, if all the features have already been selected, then the component loops to block 303 to select the next frame, else the component continues at block 307. In block 307, the component extracts the selected feature from the selected frame. In block 308, the component adds the extracted feature to the feature vector for the selected frame and then loops to block 305 to select the next feature. In block 310, the component generates a code vector for the selected voice sample by applying a dimension reduction technique to the feature matrix. In block 310, the component generates clusters of code vectors using various clustering techniques such as K-means. In block 311, the component calculates a representative code vector, such as a centroid, for each cluster and adds the code vector to the codebook. The codebook thus contains a representative code vector for each cluster. The component then returns a codebook.

Figure 4:
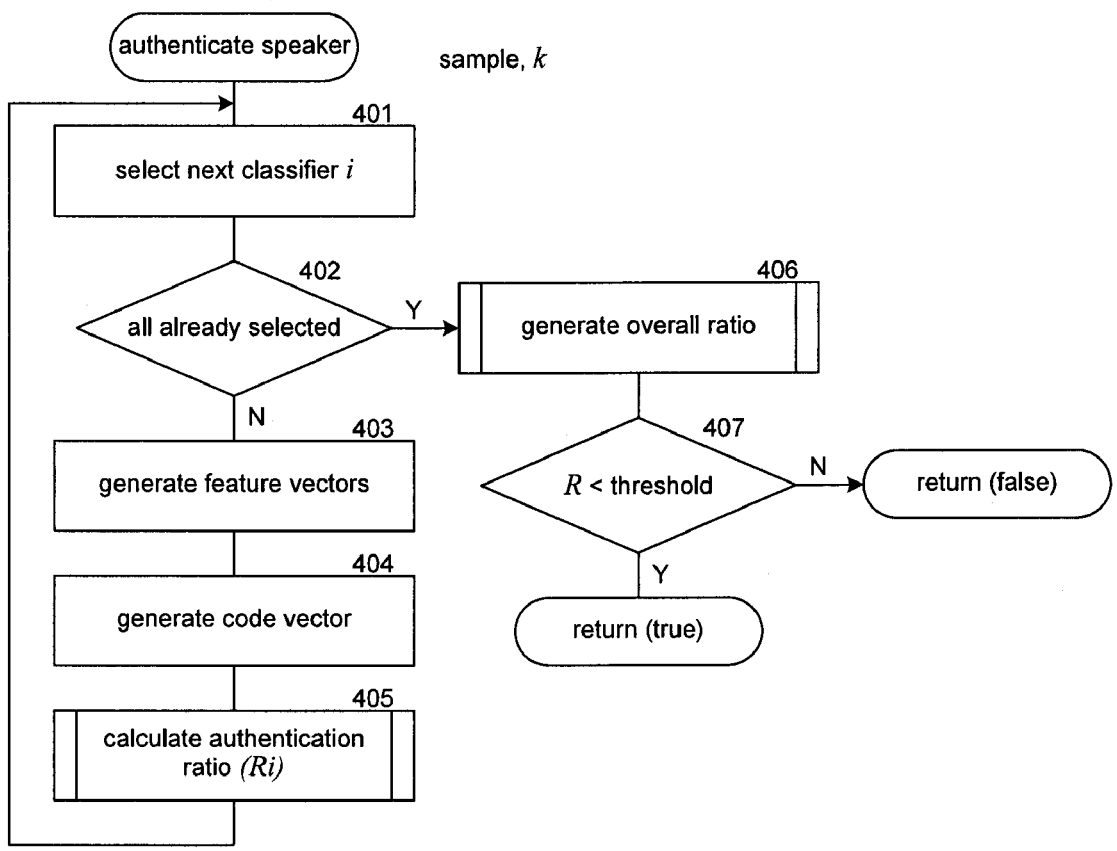
FIG. 4 is a flow diagram that illustrates the processing of the authenticate speaker component of the speaker recognition system in one embodiment.

FIG. 4 is a flow diagram that illustrates the processing of the authenticate speaker component of the speaker recognition system in one embodiment. The component is passed a voice sample of a person and an indication of a purported speaker and returns an indication of whether the voice sample can be authenticated as that of the purported speaker. In blocks 401-405, the component loops calculating an classifier score for each classifier. In block 401, the component selects the next classifier. In decision block 402, if all the classifiers have already been selected, then the component continues at block 406, else the component continues at block 403. In block 403, the component generates a sequence of feature vectors for the voice sample for the selected classifier. In block 404, the component generates a code vector from the sequence of feature vectors such as by applying a discrete cosine transfer. In block 405, the component invokes the calculate classifier score component to generate a classifier score for the selected classifier. The component then loops to block 401 to select the next classifier. In block 406, the component invokes the generate overall score component to combine the classifier scores of the classifiers into an overall score. In decision block 407, if the overall score satisfies an authentication criterion, then the component returns an indication that the voice sample has been authenticated as being that of the purported speaker, else the component returns an indication that the voice sample cannot be authenticated.

Figure 5:
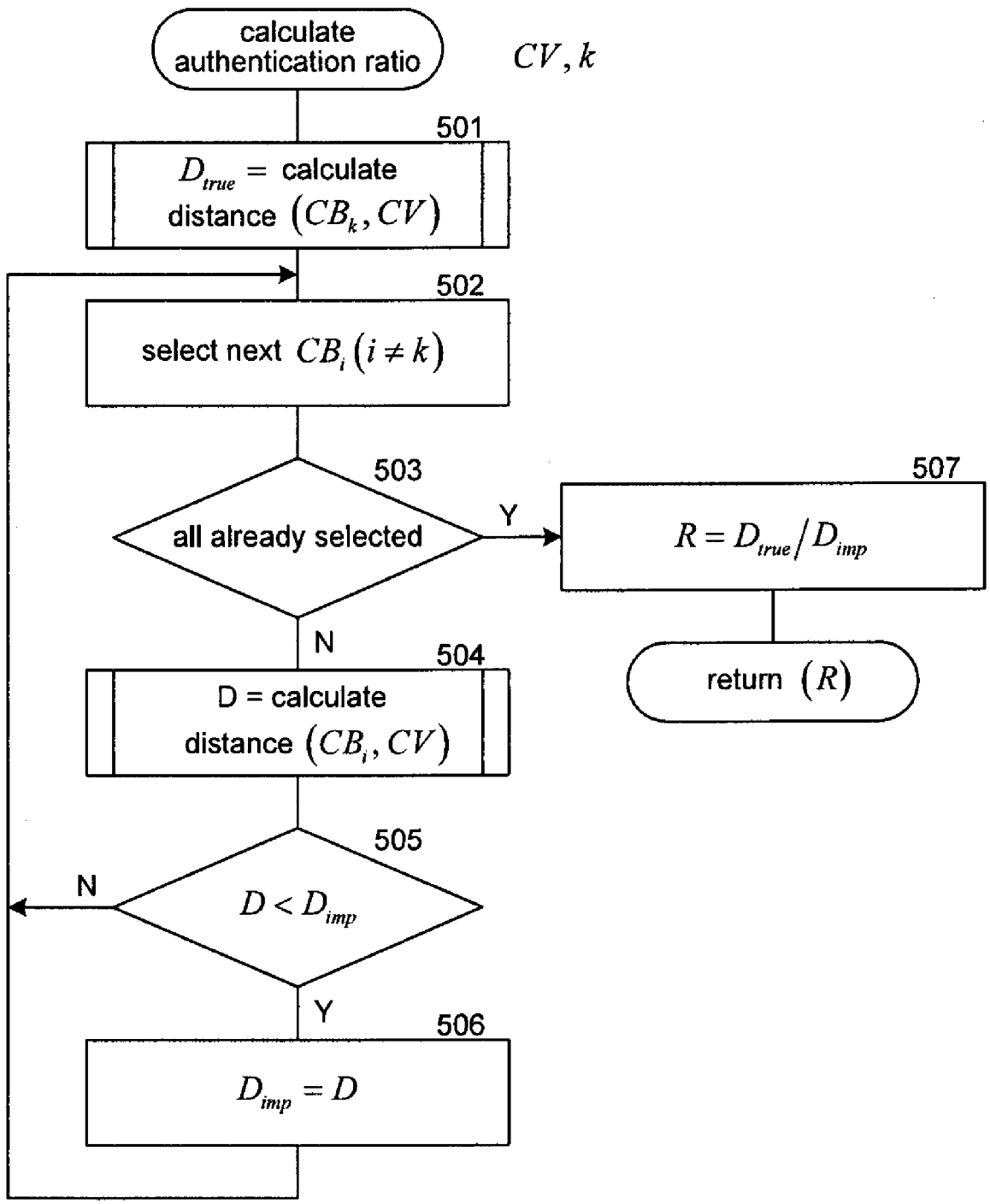
FIG. 5 is a flow diagram that illustrates the processing of the calculate authentication ratio component of the speaker recognition system in one embodiment.

FIG. 5 is a flow diagram that illustrates the processing of the calculate classifier score component of the speaker recognition system in one embodiment. The component is passed a code vector along with an indication of a purported speaker. The component returns a classifier score, such as an authentication ratio, indicating whether that code vector is from the purported speaker. In block 501, the component invokes the calculate distance component to calculate the true distance between a codebook for the purported speaker and the code vector. In blocks 502-506, the component loops selecting each codebook other than that of the purported speaker to identify the minimum distance, which is the imposter distance. In block 502, the component selects the next codebook. In decision block 503, if all the codebooks have already been selected, then the component continues at block 507, else the component continues at block 504. In block 504, the component invokes the calculate distance component to calculate the distance between the code vector and the selected codebook. In decision block 505, if the distance is less than the imposter distance calculated so far, then the component continues at block 506, else the component loops to block 502 to select the next codebook. In block 506, the component sets the imposter distance to the calculated distance and then loops to block 502 to select the next codebook. In block 507, the component calculates the authentication ratio as the ratio of the true distance to the imposter distance and then returns that ratio as the classifier score.

Figure 6:
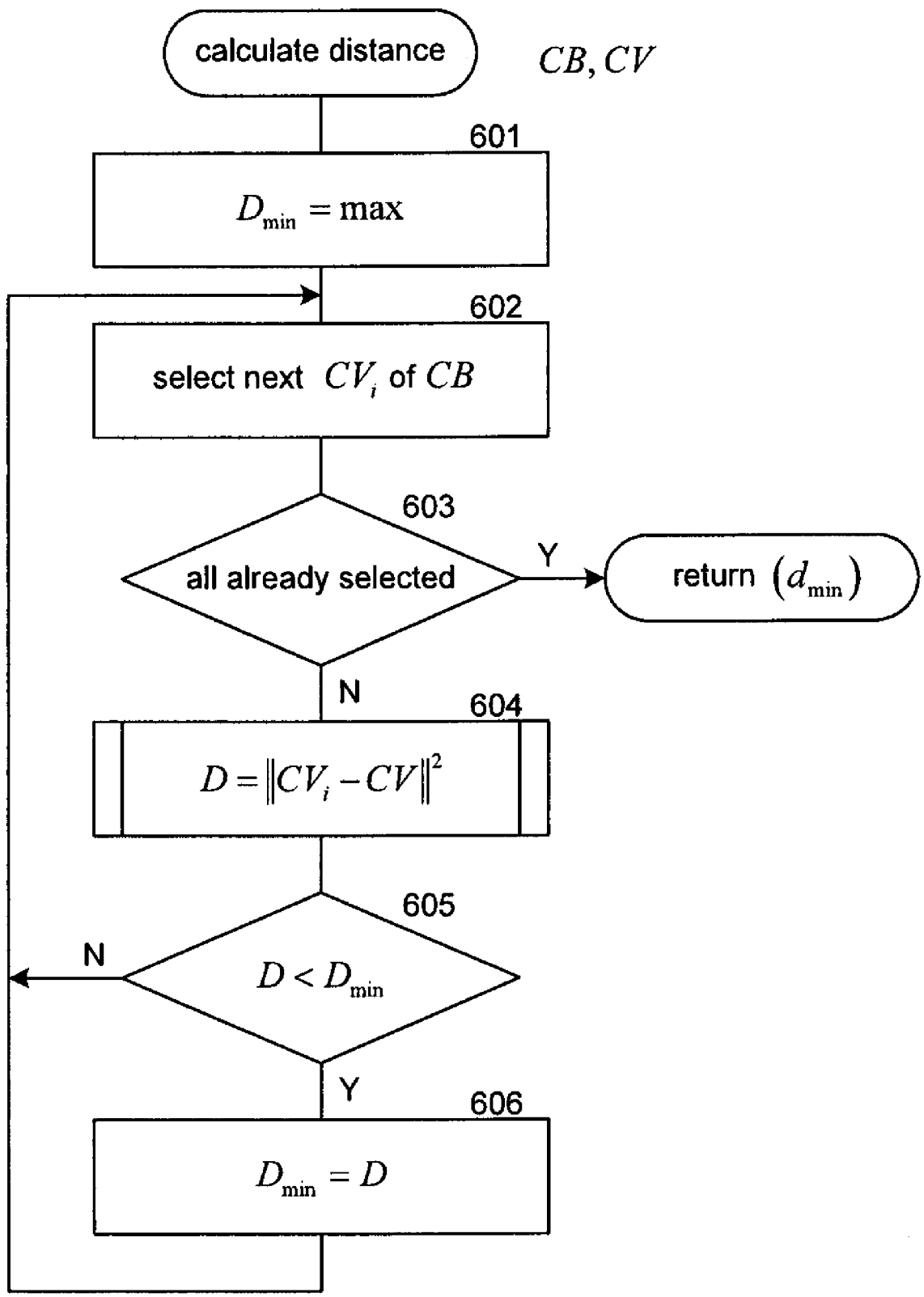
FIG. 6 is a flow diagram that illustrates the processing of the calculate distance component of the speaker recognition system in one embodiment.

FIG. 6 is a flow diagram that illustrates the processing of the calculate distance component of the speaker recognition system in one embodiment. The component is passed a codebook and a code vector and calculates the distance between them. In block 601, the component initializes the minimum distance to the maximum possible distance. In block 602, the component selects the next code vector of the codebook. In decision block 603, if all the code vectors have already been selected, then the component returns the minimum distance as the distance between the codebook and the code vector, else the component continues at block 604. In block 604, the component calculates the distance between the selected code vector and the passed code vector. In decision block 605, if the calculated distance is less than the minimum distance calculated so far, then the component continues at block 606, else the component loops to block 602 to select the next code vector. In block 606, the component sets the minimum distance to the calculated distance and then loops to block 602 to select the next code vector.

Figure 7:
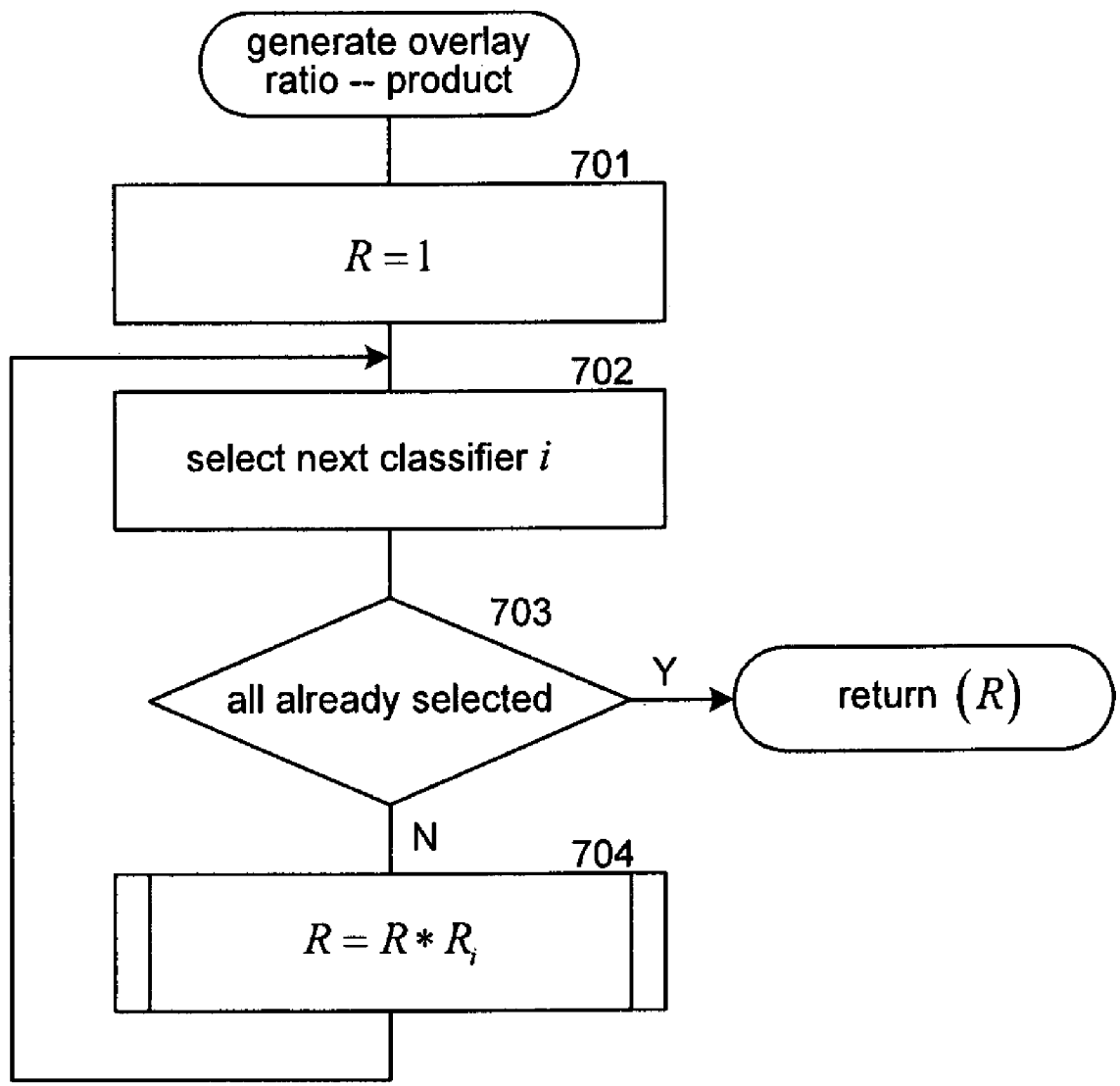
FIG. 7 is a flow diagram that illustrates the generating of an overall authentication ratio based on a product of all the authentication ratios of the classifiers.
Figure 8:
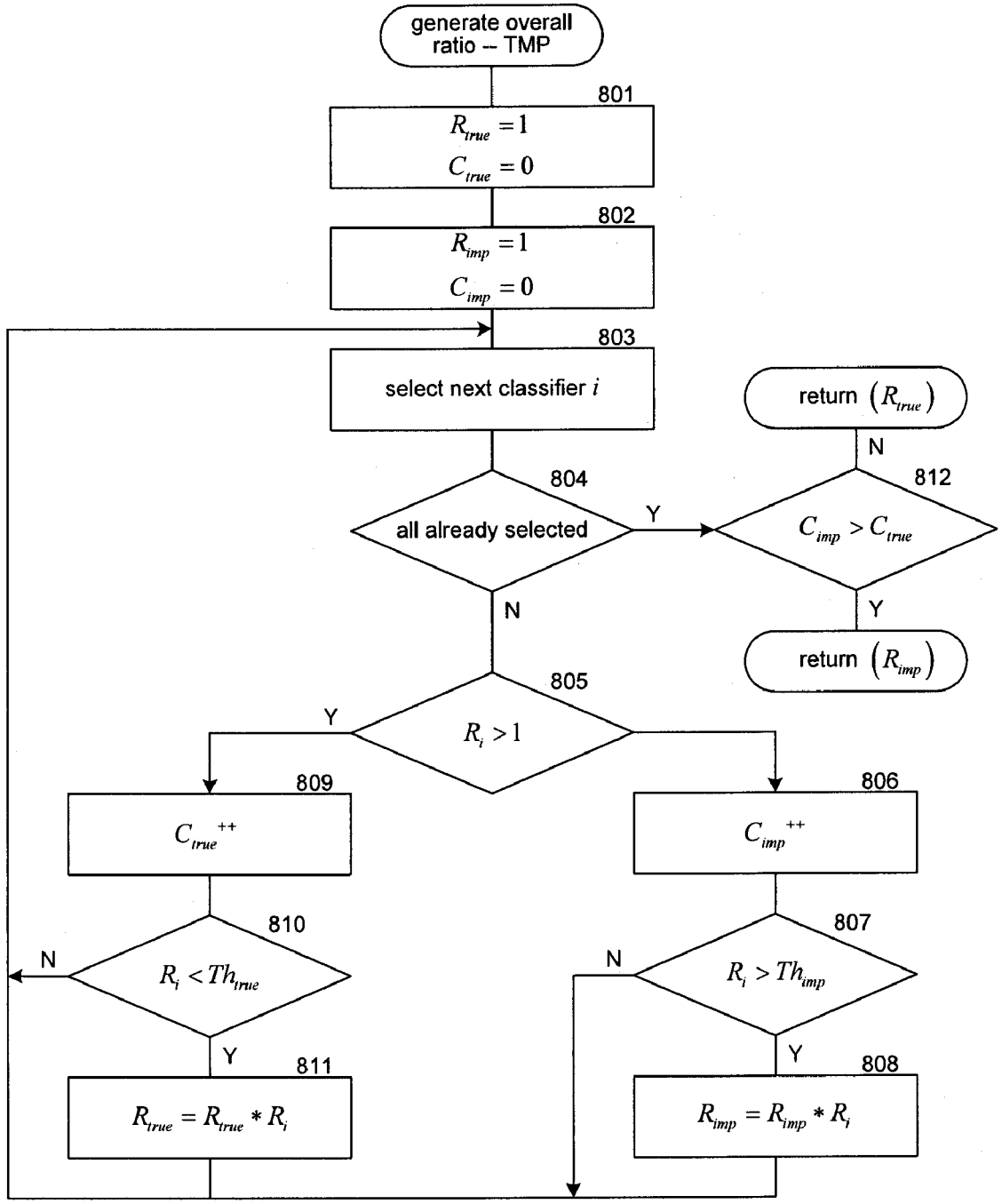
FIG. 8 is a flow diagram that illustrates the generating of an overall authentication ratio based on the TMP technique.

FIGS. 7-8 are flow diagrams that illustrate different algorithms for generating an overall score. The components are passed the classifier scores and return an overall score. FIG. 7 is a flow diagram that illustrates the generating of an overall score based on a product of the classifier scores of the classifiers. In block 701, the component initializes the overall score. In block 702, the component selects the next classifier. In decision block 703, if all the classifiers have already been selected, then the component returns the overall score, else the component continues at block 704. In block 704, the component multiplies the classifier score of the selected classifier by the overall score to generate a new overall score. The component then loops to block 702 to select the next classifier.

FIG. 8 is a flow diagram that illustrates the generating of an overall score based on the TMP technique. In block 801, the component initializes a true ratio and a true count. In block 802, the component initializes an imposter ratio and an imposter count. In blocks 803-811, the component loops accumulating the true ratios and true counts of classifiers that indicated that the person was authenticated as the purported speaker and the imposter ratios and imposter counts of the classifiers that indicated that the person was not authenticated. In block 803, the component selects the next classifier. In decision block 804, if all the classifiers have already been selected, then the component continues at block 812, else the component continues at block 805. In decision block 805, if the passed classifier score for the selected classifier is greater than one, then the classifier indicated possibly an imposter and the component continues at block 806, else the classifier indicated possibly the purported speaker and the component continues at block 809. In block 806, the component increments the imposter count. In decision block 807, if the passed ratio of the selected classifier is greater than an imposter threshold, then the component continues at block 808, else the component loops to block 803 to select the next classifier. In block 808, the component multiplies the ratio of the selected classifier times the imposter ratio to generate a new imposter ratio. The component then loops to block 803 to select the next classifier. In block 809, the component increments a true count. In decision block 810, if the ratio of the selected classifier is less than a true threshold, then the component continues at block 811, else the component loops to block 803 to select the next classifier. In block 811, the component multiplies the ratio of the selected classifier by the true ratio to generate a new true ratio. The component then loops to block 803 to select the next classifier. In decision block 812, if the imposter count is greater than the true count, then the component returns the imposter ratio, else the component returns the true ratio. The RTMP algorithm works in a similar manner except it divides the ratio returned by the other ratio. For example, if the imposter ratio is returned, then the RTMP algorithm divides the imposter ratio by the true ratio. The differences between 1 and the imposter threshold and between 1 and the true threshold allow for only combining classifier score that may be considered a strong indication of an imposter or the purported speaker. For example, a score of 0.9 or 1.1 may not be a strong indication of the purported speaker or an imposter. Thus, the true threshold might be set to 0.5 and the imposter threshold may be set to 1.5. One skilled in the art will appreciate that these thresholds can be learned as described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. One skilled in the art will appreciate that various combinations of the techniques described above can be used in a speaker recognition system. For example, a speaker recognition system may be text-conditioned and may use a feature matrix. As another example, a speaker recognition system may use the RTMP algorithm and segmented feature vectors. Accordingly, the invention is not limited except as by the appended claims.

I claim:

1. A method in a computing device for recognizing a target object, the method comprising:
   storing multiple patterns for each of a plurality of objects as training data;
   training a plurality of classifiers by:
      for each object,
         for each of the plurality of classifiers,
            generating by the computing device a classifier-specific feature vector for each pattern for that classifier for that object, a classifier-specific feature vector having features that are specific to that classifier such that at least two classifiers have different features;
            generating by the computing device code vectors for that classifier for that object by quantizing the generated classifier-specific features for that classifier for that object; and
            generating by the computing device representative code vectors for that classifier for that object from the generated code vectors for that classifier for that object;
   receiving a pattern of the target object;
   recognizing the target object by:
      for each of the plurality of classifiers,
         generating a classifier-specific feature vector for that classifier from the pattern of the target object; and
         generating a code vector for that classifier from the generated feature vectors of that classifier; and
      generating an overall score indicating that the target object is a certain one of the plurality of objects by applying each classifier to the code vector for that classifier for the target object and the representative vector for that classifier for that certain object to generate a classifier score for each classifier and combining the classifier scores into the overall score.

2. The method of claim 1 wherein the objects are persons and the patterns of the objects are voice samples from the person.

3. The method of claim 2 wherein the features of Mel Frequency Cepstral Coefficients.

4. The method of claim 1 wherein a classifier is a nearest neighbor classifier.

5. The method of claim 1 wherein the representative code vectors are generated by clustering the code vectors and generating a code vector that is representative of each cluster.

6. The method of claim 5 wherein a representative code vector is a mean code vector of a cluster.

7. The method of claim 1 wherein a code vector is a compact representation of the feature vectors of the pattern.

8. A method in a computing device for recognizing a target object, the method comprising:
   storing multiple patterns for each of a plurality of objects;
   generating by the computing device a compact feature matrix for each pattern of each object derived from a feature matrix of a sequence of feature vectors over time representing samples of the pattern, the feature matrix having a row for each of a plurality of classifiers and a column for each sample of the pattern, each entry for a row and a column have a classifier-specific vector for the classifier of that row and the sample of the pattern;
   receiving a pattern of the target object;
   generating a compact feature matrix of the pattern of the target object derived from a feature matrix of a sequence of feature vectors over time of the target object; and
   deriving a score from the compact feature matrix of the patterns of the target object and the compact feature matrices of the patterns of an object, the score indicating whether the target object is that object.

9. The method of claim 8 wherein the compact feature matrix is a one dimensional representation of the feature matrix.

10. The method of claim 8 wherein a score is derived for each of a plurality of classifiers that each has classifier-specific features.

11. The method of claim 8 wherein the feature matrix represents the variations of the pattern over time.

12. The method of claim 8 wherein the generating of the compact feature matrix include generating a code vector for each feature vector, clustering the code vectors, and identifying a representative code vector for each cluster.

13. The method of claim 12 wherein the code a score is derived using a nearest neighbor algorithm.

14. A method in a computing device for authenticating a target object, the method comprising:

storing multiple patterns for each of a plurality of objects;

for each object, generating by the computing device a model of the patterns of the object by creating a classifier-specific feature vector for each of a plurality of classifiers, a classifier-specific feature vector having classifier-specific features extracted from the patterns of the object;

receiving a pattern of the target object; and a separate indication of an object that the pattern is purported to match;

generating a classifier-specific feature vector for each of the plurality of classifiers, the classifier-specific feature vector having classifier-specific features from the sample of the target pattern;

generating a classifier score for each classifier that is a ratio of a distance score indicating a likelihood of the target object matching the object it is purported to match and a distance score indicating a likelihood of the target object matching another of the objects; and generating an overall score indicating that the target object matches the object that it is purported to match from the classifier scores.

15. The method of claim 14 wherein the distance scores are based on distance between feature vectors indicating a likelihood of the target object matching the object it is purported to match and feature vectors indicating a likelihood of the target object matching another of the object.

16. The method of claim 14 wherein the overall score is generated using a trend modified product algorithm.

17. The method of claim 14 wherein the overall score is generated using a ratio of trend modified products algorithm.

18. The method of claim 14 wherein the generating of the model includes:

for each object,
  for each classifier,
    generating a classifier-specific feature vector for each sample of the object;
    generating code vectors by quantizing the classifier-specific features; and
    generating representative code vectors for the classifier for the object from the generated code vectors.

19. The method of claim 18 wherein the generating of a classifier score includes generating a code vector for each feature vector.

20. The method of claim 1 wherein the objects are persons and the patterns of the objects are voice samples from the person.

* * * * *